United States Patent
Shan et al.

(10) Patent No.: US 11,551,277 B2
(45) Date of Patent: Jan. 10, 2023

(54) SYSTEM AND METHOD FOR AUTOMATIC GENERATION OF KNOWLEDGE-POWERED CONTENT PLANNING

(71) Applicants: Beijing Wodong Tianjun Information Technology Co., Ltd., Beijing (CN); JD.com American Technologies Corporation, Mountain View, CA (US)

(72) Inventors: Huasong Shan, Mountain View, CA (US); Li Chen, Mountain View, CA (US); Hui Zhou, Sunnyvale, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 245 days.

(21) Appl. No.: 17/018,665

(22) Filed: Sep. 11, 2020

(65) Prior Publication Data
US 2022/0084098 A1 Mar. 17, 2022

(51) Int. Cl.
*G06F 16/00* (2019.01)
*G06Q 30/06* (2012.01)
(Continued)

(52) U.S. Cl.
CPC ....... *G06Q 30/0629* (2013.01); *G06F 16/353* (2019.01); *G06F 40/117* (2020.01); *G06K 9/6215* (2013.01)

(58) Field of Classification Search
CPC . G06Q 30/0629; G06F 16/353; G06F 40/117; G06K 9/6215
See application file for complete search history.

(56) References Cited

U.S. PATENT DOCUMENTS

| 7,082,426 B2 * | 7/2006 | Musgrove | G06Q 20/12 715/204 |
| 2009/0254540 A1 * | 10/2009 | Musgrove | G06F 16/31 707/999.005 |

FOREIGN PATENT DOCUMENTS

| CN | 110019662 A | * | 7/2019 | ....... G06F 17/30684 |
| CN | 110213342 A | * | 9/2019 | |

(Continued)

OTHER PUBLICATIONS

David M Blei, Andrew Y Ng, & Michael I Jordan, Latent dirichlet allocation, Journal of machine Learning research, 2003, 993-1022.

(Continued)

*Primary Examiner* — Leslie Wong
(74) *Attorney, Agent, or Firm* — Scully, Scott, Murphy & Presser, P.C.

(57) ABSTRACT

A system and a method for obtaining a content plan are provided. The system includes a computing device configured to: provide a tag for each clause of each sentence of each product description of each of a category of products, where the tags include introductive tags corresponding to attributions of the products and description tags corresponding to descriptions of the products; determine tag exclusiveness, tag similarity, tag distance, and tag causality between the tags; generate candidate tag sequences the product descriptions; and filter the candidate tag sequences using the tag exclusiveness, the tag similarity, the tag distance and the tag causality to obtain the content plan.

18 Claims, 10 Drawing Sheets

(51) Int. Cl.
  *G06K 9/62* (2022.01)
  *G06F 40/117* (2020.01)
  *G06F 16/35* (2019.01)

(56) References Cited

FOREIGN PATENT DOCUMENTS

CN    110929021 A  *  3/2020
CN    111651970 A  *  9/2020

OTHER PUBLICATIONS

Adji B Dieng, Chong Wang, Jianfeng Gao, and John Paisley, Topicrnn: A recurrent neural network with long-range semantic dependency, 2016, arXiv:1611.01702.

Bingyu Wang, Li Chen, Wei Sun, Kechen Qin, Kefeng Li, & Hui Zhou, Ranking-Based Autoencoder for Extreme Multi-label Classification, In Proceedings of the 2019 Conference of the North American Chapter of the Association for Computational Linguistics: Human Language Technologies, 2019, V1 (Long and Short Papers): 2820-2830.

https://en.wikipedia.org/wiki/Fisher%27s_exact_test, Aug. 23, 2020, pp. 1-7.

Ratish Puduppully, Li Dong, and Mirella Lapata, Data-to-text generation with content selection and planning, In Proceedings of the AAAI Conference on Artificial Intelligence, 2019, v33: 6908-6915.

Sebastian Gehrmann, Falcon Z Dai, Henry Elder, & Alexander M Rush, End-to-End Content and Plan Selection for Data-to-Text Generation, 2018, In Proceedings of the 11th International Conference on Natural Language Generation, 46-56.

* cited by examiner

```
tag_corpus = ['8kg', 'white', 'roller', 'fixed-frequency', 'home']
2-grams = [('8kg', 'white'), ('white', 'roller'), ('roller', 'fixed-frequency'), ('fixed-frequency', 'home')]
3-grams = [('8kg', 'white', 'roller'), ('white', 'roller', 'fixed-frequency'), ('roller', 'fixed-frequency', 'home')]
4-grams = [('8kg', 'white', 'roller', 'fixed-frequency'), ('white', 'roller', 'fixed-frequency', 'home')]
5-grams = [('8kg', 'white', 'roller', 'fixed-frequency', 'home')]
```

FIG. 5

```
Input: sentences with labelled topics for a product
Output: a set of topic sequences
Procedure:
Begin
  Initialize topic_list; /* get all topics from dataset */
  Construct topic_corpus, /* merge all topic sequences in the dataset together as a corpus */
  set_of_candidate_sequences = {} /* initialize a null set to save the candidates */
  /* iterate all topics for each product, generate candidate sequences for each topic */
  for t in topic_list:
    /* use n-gram to generate candidate sequences, e.g., we can set maximal n as 5 */
    n = 5 /* it can generate maximal length of a topic sequence as 5 */
    for i in (2, n):
      start_topic = t /* use current topic t as start */
      scan_window = i /* i as scanning window size */
      /* scan the topic corpus to generate topic sequences with length equivalent to scanning window size */
      while not is rear of the corpus: /* check where is rear of the corpus */
        seq = scan_corpus(start_topic, scan_window) /* get a sequence with start topic is t */
        if seq not in set_of_candidate_sequences: /* check whether the seq is in candidate set */
          add seq in set_of_candidate_sequences /* if not, add the seq into candidate set */
        slide a scanning window /* slide a scanning point next window */
      end while
    end for
  end for
End
```

FIG. 6

```
Input: candidate_set_of_seq /* a set of candidate topic sequences for a product generated by algorithm
in FIG. 6*/
Output: a set of coherent topic sequences
Procedure:
  final_set_of_seq = {} /* record the coherent topic sequences filtered by versatile knowledges */
  E = subset of candidate_set_of_seq filtered by exclusiveness knowledge
  S = subset of E filtered by similarity knowledge
  D = subset of E filtered by distance knowledge
  C = subset of E filtered by causality knowledge
  SD = intersection(S,D)
  SC = intersection(S,C)
  DC = intersection(D,C)
  SDC = intersection(S,D,C)
  if SDC is not empty:
      final_set_of_seq = SDC  /*FIG. 7A*/
  else
    if SD and SC and DC are all empty:
     final_set_of_seq = min(S, D, C) /*FIG. 7C*/
    else:
     final_set_of_seq = min(S, D, C, SD, SC, DC) /*FIG. 7B*/
```

FIG. 8

| Product | Methods | Coherency rate |
|---|---|---|
| garment | Knowledge-based | 95.2% |
| | RNN-based | 69.8% |
| air-conditioner | Knowledge-based | 91.1% |
| | RNN-based | 70.8% |
| television | Knowledge-based | 93.2% |
| | RNN-based | 70.5% |
| washer | Knowledge-based | 89.6% |
| | RNN-based | 53.8% |
| refrigerator | Knowledge-based | 89.0% |
| | RNN-based | 71.1% |

FIG. 11

SYSTEM AND METHOD FOR AUTOMATIC GENERATION OF KNOWLEDGE-POWERED CONTENT PLANNING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates generally to the field of content planning, and more particularly to systems and methods for automatic generation of knowledge-powered content planning for coherent product description in e-commerce.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Major E-commerce sites, such as, <JD.com>, <Taobao.com>, operate several product channels, e.g., recommendation texts. However, generation of these content-based channels requires massive human involvement.

Therefore, an unaddressed need exists in the art to address the aforementioned deficiencies and inadequacies.

SUMMARY

In certain aspects, the present disclosure relates to a system for assessing text content of a product. In certain embodiments, the system includes a computing device. The computing device includes a processor and a storage device storing computer executable code. The computer executable code, when executed at the processor, is configured to:

provide a tag for each clause of each sentence of each product description of each of a category of products, where the tags comprise a plurality of introductive tags corresponding to industrial attributions of the category of products and a plurality of description tags corresponding to a plurality of descriptions of the category of products;

determine tag exclusiveness between any two of the tags, where the two of the tags are defined as having the tag exclusiveness when both of them are introductive tags;

determine tag similarity between any two of the tags based on co-occurrence rate of the two of the tags in the product descriptions;

determine tag distance between any two of the tags based on a number of the clauses between the two of the tags in the product descriptions where the two of the tags co-occur;

determine tag causality between any two of the tags based on a causation relationship between the two of the tags in the product descriptions where the two of the tags co-occur;

generate candidate tag sequences from each of the product descriptions using the tags therein; and filter the candidate tag sequences using the tag exclusiveness, the tag similarity, the tag distance and the tag causality to obtain the content plan.

In certain embodiments, the category of products are large product categories such as clothing, consumer electronics, home appliance, computer and office, sports and outdoors, health and beauty, toys, and shoes. In certain embodiments, the category of products are smaller product categories such as refrigerator, air-conditioner, television, and washing machine.

In certain embodiments, the category of products is clothing, and the industrial attributions comprise size, color, and material. In certain embodiments, the category of products is clothing, and the descriptions comprise functionality, style, feeling, potential audience, and scene.

In certain embodiments, the computer executable code is configured to determine the tag similarity using Fisher's exact test. In certain embodiments, the computer executable code is configured to determine the tag distance between the two of the tags by averaging the tag distances between the two tags in the product descriptions where the two of the tags co-occur. In certain embodiments, the computer executable code is configured to determine that the tag causality exists between the two of the tags when at least one of terms "lead to," "stem from," "because of," and "due to" exists between the two of the tags in any of the product descriptions where the two of the tags co-occur.

In certain embodiments, the computer executable code is configured to generate the candidate tag sequences using N-gram. In certain embodiments, N is a positive integer in the range of three to ten. In certain embodiments, N is five.

In certain embodiments, the computer executable code is configured to filter the candidate tag sequences by:

removing the candidate tag sequences that contain two introductive tags; and retaining tag sequences that at least have the tag distance less than a pre-defined tag distance threshold, have the tag similarity greater than a pre-defined tag similarity threshold, or have the tag causality.

In certain embodiments, the computer executable code is further configured to generate a new product description based on the content plan.

In certain aspects, the present disclosure relates to a method for generating a content plan. In certain embodiments, the method includes:

providing, by a computing device, a tag for each clause of each sentence of each product description of each of a category of products, where the tags comprise a plurality of introductive tags corresponding to industrial attributions of the category of products and a plurality of description tags corresponding to a plurality of descriptions of the category of products;

determining, by the computing device, tag exclusiveness between any two of the tags, where the two of the tags are defined as having the tag exclusiveness when both of them are introductive tags;

determining, by the computing device, tag similarity between any two of the tags based on co-occurrence rate of the two of the tags in the product descriptions;

determining, by the computing device, tag distance between any two of the tags based on a number of the clauses between the two of the tags in the product descriptions where the two of the tags co-occur;

determining, by the computing device, tag causality between any two of the tags based on a causation relationship between the two of the tags in the product descriptions where the two of the tags co-occur;

generating, by the computing device, candidate tag sequences from each of the product descriptions using the tags therein; and filtering, by the computing device, the candidate tag sequences using the tag exclusiveness, the tag similarity, the tag distance and the tag causality to obtain the content plan.

In certain embodiments, the category of products comprises clothing (or garment), refrigerator, air-conditioner, television, and washing machine. In certain embodiments, the category of products is clothing, and the industrial attributions comprise size, color, and material, and the descriptions comprise functionality, style, feeling, potential audience, and scene In certain embodiments, the step of determining the tag similarity is performed using Fisher's exact test; the step of determining the tag distance between the two of the tags is performed by averaging the tag distances between the two tags in the product descriptions where the two of the tags co-occur; and the tag causality between the two of the tags is determined when at least one of terms "lead to," "stem from," "because of," and "due to" exists between the two of the tags in any of the product descriptions where the two of the tags co-occur.

In certain embodiments, the candidate tag sequence is generated using N-gram. In certain embodiments, N is a positive integer from three to ten. In certain embodiments, N is five.

In certain embodiments, the step of filtering the candidate tag sequences includes removing the candidate tag sequences that contain two introductive tags; and retaining tag sequences that at least have the tag distance less than a pre-defined tag distance threshold, have the tag similarity greater than a pre-defined tag similarity threshold, or have the tag causality.

In certain embodiments, the method further includes generating a new product description based on the content plan.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 5 schematically depicts generation of 2-gram to 5-gram tag sequences using a tag sequence having five sequential tags according to certain embodiments of the present disclosure.

FIG. 6 schematically depicts generation of candidate tag sequences of a category of products according to certain embodiments of the present disclosure.

FIG. 8 schematically depicts filtering of candidate tag sequences using learned knowledge according to certain embodiments of the present disclosure.

FIG. 11 schematically depicts comparison between content plans generated by knowledge-based method according the present disclosure and RNN-based method.

DETAILED DESCRIPTION

Figure 1:
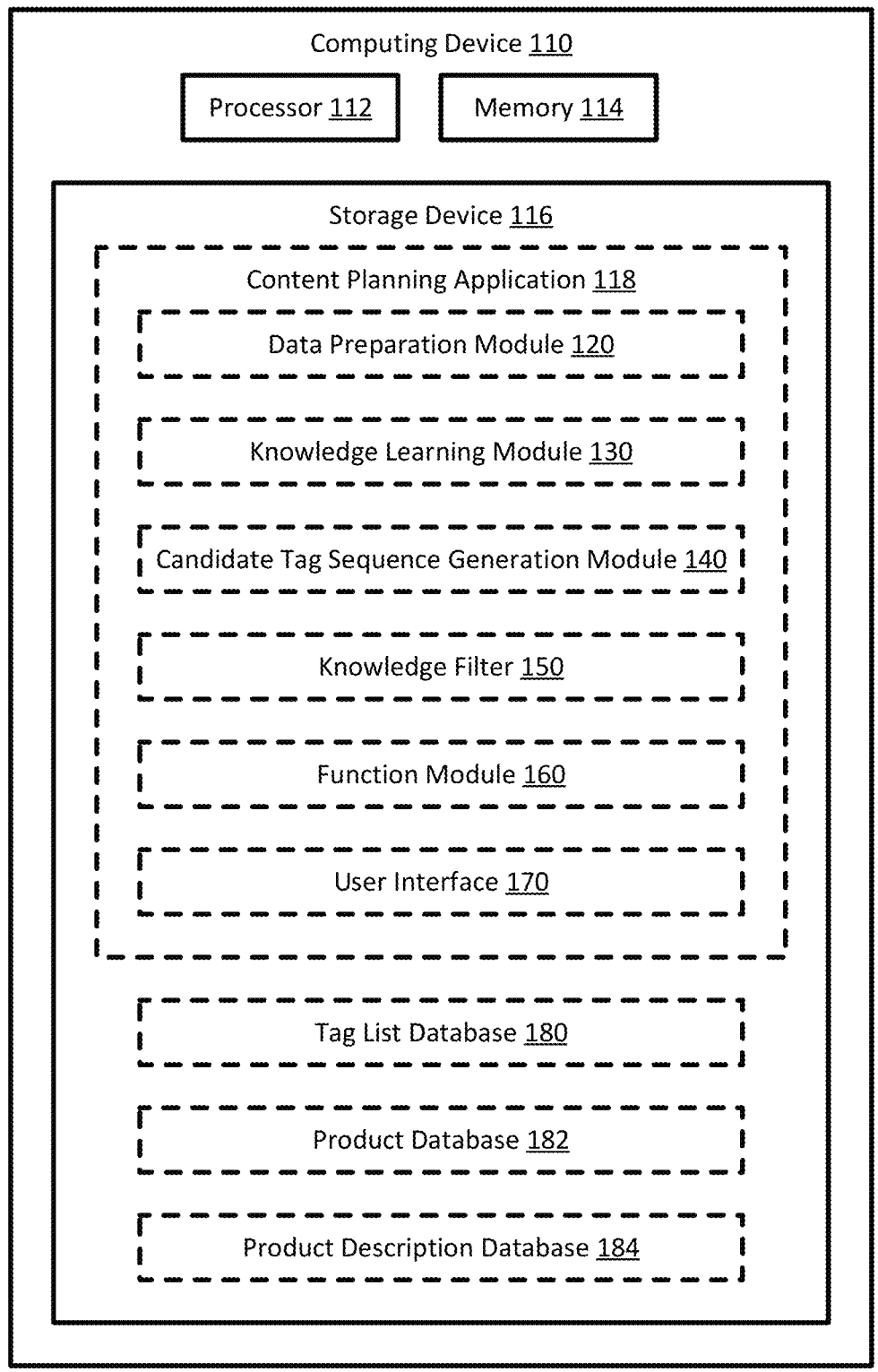
FIG. 1 schematically depicts a system for obtaining a content plan for a category of products according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As described above, generation of product descriptions is important for customer shopping experience, but it is challenging to generate a large number of product descriptions by human. To solve the problem, in certain embodiments, the present disclosure provides a method to generate product descriptions automatically. The product description is typically a simple paragraph that describe products' appearance, functionality, potential audiences, scenes, etc., and the paragraph may be based on product industrial attributions such as capacity (118 L), door design (up-down asymmetry), color (black or white), compressor (variable frequency) of a fridge. In certain embodiments, the automatic generation of a product description include two stages, content planning and sentence planning. Content planning is to design theme extension from product attributions. For example, "black" or "white" can extend to "pretty," "up-down asymmetry" can extend to "fashionable," "variable frequency" can extend to "energy conservative," and "118 L" can extend to "fit-for-small-family." Sentence planning is to make sentence for each theme. The generation of product descriptions needs to consider content planning and sentence planning, where the content planning determines the relationship of themes of each sentence, and guarantees the coherency of a whole paragraph, while the sentence planning determines the structure and lexical content of each sentence.

In certain aspects, the present disclosure provides a system and a method for automatically generating coherent content plan for product description given product attributions and a dataset of product descriptions written by human writers. FIG. 1 schematically depicts a system for generating a content plan for product description according to certain embodiments of the present disclosure. As shown in FIG. 1, the system 100 includes a computing device 110. In certain embodiments, the computing device 110 may be a server computer, a cluster, a cloud computer, a general-purpose computer, a headless computer, or a specialized computer, which generates a content plan. The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. In certain embodiments, the processor 112 can execute an operating system (OS) or other applications of the computing device 110. In certain embodiments, the computing device 110 may have more than one CPU as the processor, such as two CPUs, four CPUs, eight CPUs, or any suitable number of CPUs. The memory 114 may be a volatile memory, such as the random-access memory (RAM), for storing the data and information during the operation of the computing device 110. In certain embodiments, the memory 114 may be a volatile memory array. In certain embodiments, the computing device 110 may run on more than one processor 112 and/or more than one memory 114. The storage device 116 is a non-volatile data storage media or device. Examples of the storage device 116 may include flash memory, memory cards, USB drives, solid state drives, or other types of non-volatile storage devices such as hard drives, floppy disks, optical drives, or any other types of data storage devices. In certain embodiments, the computing device 110 may have more than one storage device 116. In certain embodiments, the computing device 110 may also include a remote storage device 116.

The storage device 116 stores computer executable code. The computer executable code includes a content planning application 118, a tag list database 180, and optionally a product attribution database 182 and a product description database 184. The content planning application 118 includes the code or instructions which, when executed at the processor 112, generates a content plan. In certain embodiments, the content planning application 118 may not be executable code, but in a form of circuit corresponding to the function of the executable code. By providing a circuit instead of executable code, the operation speed of the content planning application 118 is greatly improved. In certain embodiments, as shown in FIG. 1, the content planning application 118 includes, among other things, a data preparation module 120, a knowledge learning module 130, a candidate tag sequence generation module 140, a knowledge filter 150, a function module 160, and a user interface 170.

The data preparation module 120 is configured to prepare product samples using the tag list database 180, the product database 182, and the product description database 184, and send the product samples to the knowledge preparation module 120 and the candidate tag sequence generation module 140. In certain embodiments, after the tag list 180 is defined based on the product database 182 and the product description database 184, and the product descriptions in the product description database 184 are labeled using the tag list in the tag list database 180, the data preparation module 120 may only need the labeled descriptions from the product description database 184 for data preparation.

In certain embodiments, the tag list database 180 includes multiple tag lists corresponding to different categories of products. The different categories of products includes small product categories such as air-conditioner, television, washer, refrigerator, etc., or large categories such as clothing, home appliance, phones and accessories, consumer electronics, computer and offices, etc. Each category has a corresponding tag list. In certain embodiments, the tags in the tag lists are predefined, and a number of the tags in each of the tag lists may be about a few hundreds to thousands based on the categories of the product. The tags include introductive tags and description tags. The introductive tags correspond to industrial attributions of a category of products. For the category of garments or clothing, the introductive tags may include different colors such as black, white, red, yellow, green, silver, mixed color, different necklines and collars such as high neck, boat neck, cowl neck, V-neck, and different fabrics such as cotton, silk, leather. The description tags correspond to features only described in the product descriptions but not the product industrial attribution. For example, the tags "casual" or "cotton" may be present in both the product database and the product description, but they are defined as introductive tags because they are industrial attributions present in the product database 182, and are regarded as basic information or basic attribution of the products. For the category of garments or clothing, the description tags may include different functionality such as warm, skin-friendly, breathable, elastic, durable, wrinkle-free and waterproof, different styles such as vintage, casual, classic and Bohemian, different feelings such as comfortable, light, sexy, luxury and elegant, different audiences such as female, male, neutral and couples, different scenes such as business, sporty, office, commuter, outdoor and travel. For category of refrigerator, the tag list may include introductive tags of capacity, door design, color, compressor, and description tags of concise, beautiful, glamorous, fashion, fresh.

In certain embodiments, the product database 182 includes the products provided by the e-commerce server, and the basic information of the products. Kindly note that the product database 182 provides the basis for defining introductive tags, however, when the tag list for a category of products has been defined in the tag list database 180, there is no need to provide the product industrial attributions from the product database 182 directly to the data preparation module 120.

Figure 3:
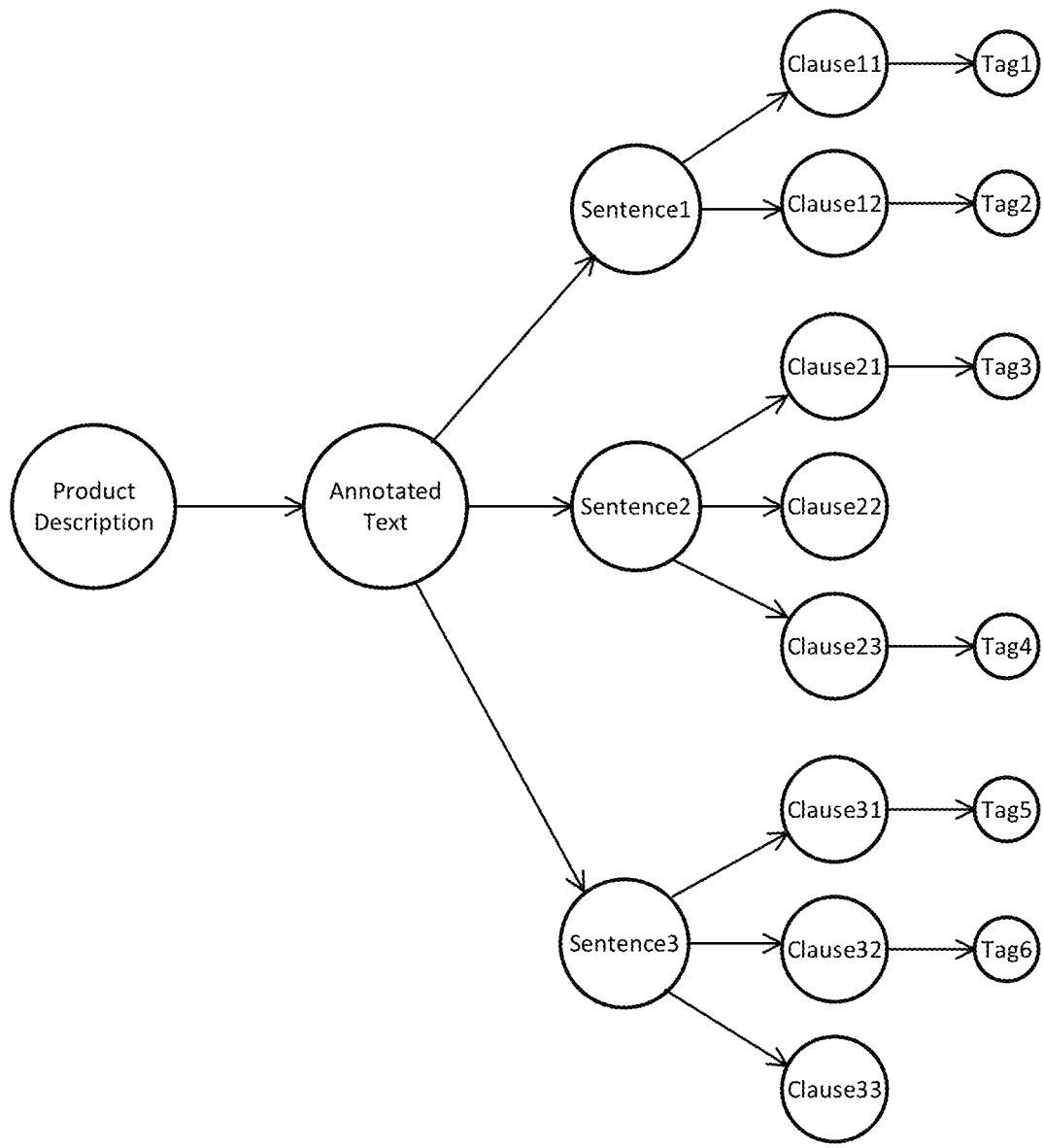
FIG. 3 schematically depicts a labeled product description according to certain embodiments of the present disclosure.

In certain embodiments, the product description database 184 includes product descriptions for each of the products in the product database 182. Each product description is a labeled text, and the labeling of the product descriptions is performed based on the defined tag list from the tag list database 180. FIG. 3 schematically shows a labeled product description according to certain embodiments of the present disclosure. As shown in FIG. 3, the product description is a text of one paragraph. The paragraph of text includes a few sentences such as sentence1, sentence2, and sentence3. Each sentence is divided into several clauses. Each of the clauses may be labeled with a tag, which is one selected from a tag list for the corresponding category of the products, where the tag list is defined in the tag list database 180. Kindly note that certain clauses, such as the clause 22 and the clause 33 may not contain much substantial information of the product or may not correspond to any of the tags in the tag list, and are thus not labeled. For convenience of data processing, the clause 22 and clause 33 may also be labeled with a dummy tag, such as tag0. Each of the tags 1-6 may be an introductive tag that also exist in the product database 182 or a description tag that only exist in the product description. In certain embodiments, the product database 182 and the product description database 184 are stored in a computing device other than the computing device 110, as long as they are accessible by the computing device 110.

Figure 2:
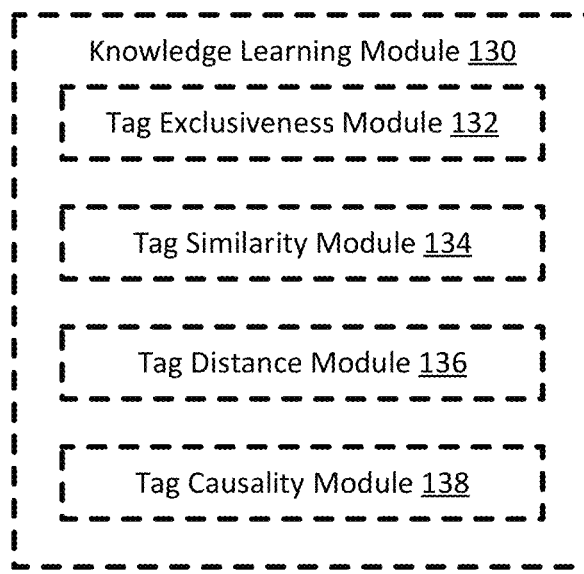
FIG. 2 schematically depicts a knowledge learning module according to certain embodiments of the present disclosure.

The knowledge learning module 130 is configured to, upon receiving the labeled product descriptions for a category of products prepared by the data preparation module 120, learn knowledge from the labeled product descriptions. Referring back to FIG. 2, the knowledge learning module 130 includes a tag exclusiveness module 132, a tag similarity module 134, a tag distance module 136, and a tag causality module 138. The modules 132-138 are configured to learn tag exclusiveness, tag similarity, tag distance, and tag causality relationships between the tags in the tag list of the category of products.

Figure 4:
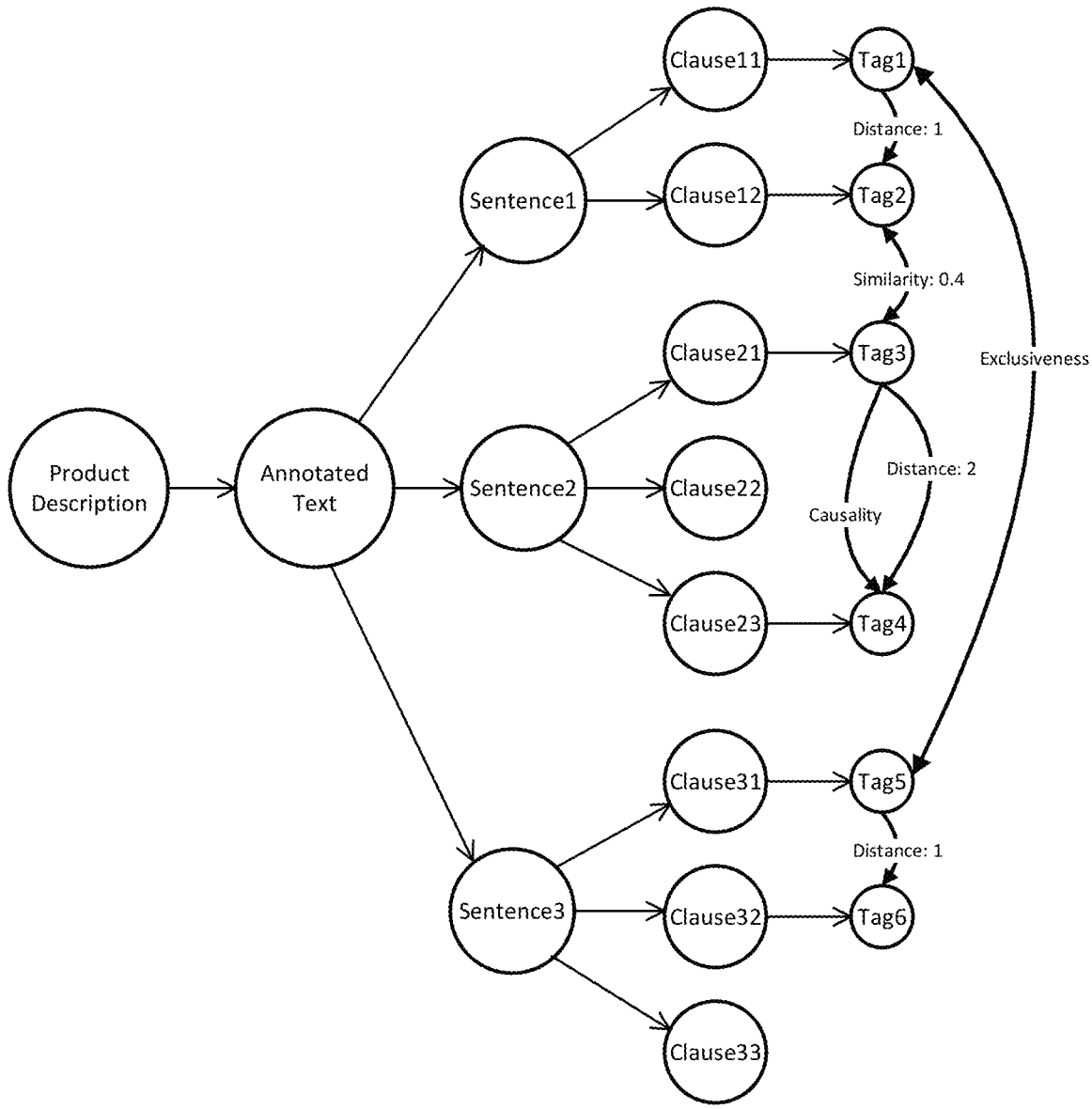
FIG. 4 schematically depicts learned relationships between tags in a labeled product description according to certain embodiments of the present disclosure.

The tag exclusiveness module 132 is configured to, upon receiving the labeled product descriptions for the category of products, learn tag exclusiveness between the tags in the tag list for the category and provide the learned tag exclusiveness to the knowledge filter 150. This knowledge can be obtained from the types of labels or tags. As described above, the tags are categorized into two types: introductive tags and descriptive tags. Introductive tag can be industrial attributions of a product, and these introductive tags should be exactly consistent with a product. The introductive tags can be used to infer another tag but cannot be inferred by other tags. All the introductive tags are mutual exclusive. Descriptive tags can represent feeling, functionality and scene of a product. Descriptive tags can be inferred by introductive tags. Descriptive tags are inclusive. In other words, if two tags are introductive tags, the two tags would have the exclusive relationship; if at least one of two tags is a descriptive tag, the two tags would have the inclusive relationship. FIG. 4 schematically shows learned relationship between the tags in a product description of FIG. 3. As shown in FIG. 4, both tag1 and tag5 are introductive tags, and thus the two tags are exclusive from each other.

The tag similarity module 134 is configured to, upon receiving the labeled product descriptions for the category of products, learn tag similarities between the tags in the tag list for the category, and provide the learned tag similarities to the knowledge filter 150. The tag similarity module 134 is configured to obtain similarity knowledge from tag's co-occurrence rate in the dataset. In certain embodiments, the co-occurrence association between tags is measured by Fisher's exact test, because production description requires very exact presentation. For example, "cotton" co-occurs with "skin-friendly," and they are treated as similar tags. This similarity measurement using co-occurrence is better than similarity measurement using word embedding, more suitable for scenarios in the present disclosure. Word embedding measures the similarity based on context. However, words with similar contexts may have different meaning. For example, "spring" and "winter" may have similar context and are regarded as similar to each other if using word embedding, but "spring" and "winter" are unlikely to co-occur in a product description, and will not be regarded as similar to each other if using co-occurrence as the standard. As shown in FIG. 4, in certain embodiments, tag2 and tag3 has a similarity of 0.4, which is calculated by the Fisher's exact test, and the similarity value is the p-value from the Fisher's exact test.

The tag distance module 136 is configured to, upon receiving the labeled product descriptions for the category of products, learn tag distances between the tags in the tag list for the category and provide the learned tag distances to the knowledge filter 150. The distance knowledge considers the pair-wise tag distance in a directional tag sequence. As shown in FIG. 4, the distance between tag1 and tag2 is 1 because clause11 and clause12 are next to each other, the distance between tag5 and tag6 is 1 because clause31 and clause32 are next to each other, the distance between tag3 and tag4 is 2 because there is a clause22 between clause21 and clause23. In certain embodiments, the disclosure is configured to calculate arithmetic average of tag distances between a pair of tags in all the product descriptions of the category of products. For example, for a total of 100 product descriptions for a category of products, tag1 and tag2 co-occur in 5 of the product descriptions, and the distances are respectively 1, 1, 3, 2, 1, then the distance between tag1 and tag2 would be 1.6, (1+1+3+2+1)/5=1.6. The distance captures the local semantic relationship between the two tags, and the smaller the distance between two tags, the closer relation the two tags have.

The tag causality module 138 is configured to, upon receiving the labeled product descriptions for the category of products, learn tag causalities between the tags in the tag list for the category, and provide the learned tag causalities to the knowledge filter 150. The disclosure regards causality relationship as the most reasonable and strictest tag order in a paragraph. In certain embodiments, the causality relationship is mined by syntactic and semantical analysis in product descriptions. In certain embodiments, causal conjunction and verb serve as a confident signal to mine a causality relationship, for example, "lead to," "stem from," "because of," "due to" are causal verb and conjunction. As shown in FIG. 4, there is a causality relationship identified from tag3 to tag4, where a causal verb and conjunction may exist in any one of clauses 21, 22 and 23. In certain embodiments, the causality relationship may also be determined when any one of other terms such as "as," "as a result of" "as long as," "by virtue of," "for," "considering," "for the sake of," "in view of," etc. exists between two tags in a product description where the two tags co-occur. In certain embodiments, as long as two tags have a causality relationship in one of the product description in the products descriptions that the two tags co-occur, the two tags are defined to have the causality relationship. In certain embodiments, the causality relationship is determined when the causality exits in two of the product descriptions the two tags co-occur.

The candidate tag sequence generation module 140 is configured to, upon receiving the labeled product descriptions, generate tag sequences from each of the product descriptions, combine those tag sequences from the different product descriptions to obtain candidate tag sequences, and provide the candidate tag sequences to the knowledge filter 150. In certain embodiments, the candidate tag sequence generation module 140 is configured to use N-gram model to generate candidate tag sequences, where N is the maximal length of tag sequences. Because a product description typically has a constraint of word number, for example 100 words, too long tag sequences might generate too long a product description, leading to violation of the constraint. Accordingly, in certain embodiments, N may be set as a positive integer from 3 to 10. In certain embodiments, N is set as 5, and the candidate tag sequence generation module 140 is configured to generate tag sequences for N from 2 to 5. As shown in FIG. 5, a product description includes 5 tags in sequence, "8 kg," "white," "roller," "fixed-frequency," and "home." The generated 10 tag sequences include four 2-gram tag sequences, three 3-gram tag sequences, two 4-gram sequences, and one 5-gram sequences. The tag sequences from all the product descriptions in a product category are the candidate tag sequences for that product category, such as refrigerator category or garment category. In certain embodiments, the tag sequence generation module 140 is further configured to remove redundant tag sequences from the combined tag sequences to obtain the candidate tag sequences.

The candidate tag sequence generation module 140 can be configured to implement the generation of candidate tag sequences in different ways. FIG. 6 schematically shows a way of generating candidate tag sequences of a product category according to certain embodiments of the present disclosure. As shown in FIG. 6, the multiple product descriptions of a product category is named a dataset. Each product description is divided to clauses, and the clauses are labeled with topics or tags. The tag list from the tag list database 180 for the category of products, may include a few hundred to a few thousand tags according to the product category. For each specific tag in the tag list, the corresponding 2-gram tag sequences, 3-gram tag sequences, 4-gram tag sequences, and 5-gram tag sequences are generated. For example, for the 2-gram tag sequences of the specific tag or topic, the candidate tag sequence generation module 140 is configured to scan the product descriptions having the specific topic. If the specific topic is not the last one in the product description, there will be a 2-gram tag sequence containing the specific topic and the topic next to it in the product description. If the 2-gram tag sequence is not in the candidate tag sequences yet, the candidate tag sequence generation module 140 would add the 2-gram tag sequence to the candidate tag sequence. After that, 3-gram, 4-gram and 5-gram tag sequences can also be determined in a similar way for the specific topic. The candidate tag sequence generation module 140 is configured to do the same 2-5 gram scanning for each of the topics in the tag list, and finally obtain the final candidate tag sequences. In a different way of generating candidate tag sequences, the candidate generation module 140 may also be configured to generate N-grams directly using the tag list for the category of products extracted from the tag list database 180.

Figure 7A:
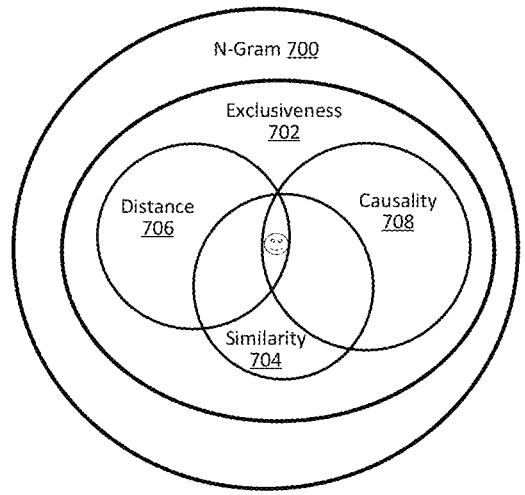
FIG. 7A schematically depicts filtering of candidate tag sequences using learned knowledge according to certain embodiments of the present disclosure.
Figure 7B:
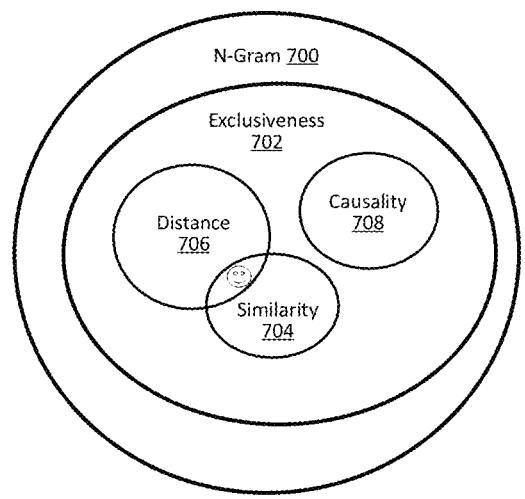
FIG. 7B schematically depicts filtering of candidate tag sequences using learned knowledge according to certain embodiments of the present disclosure.
Figure 7C:
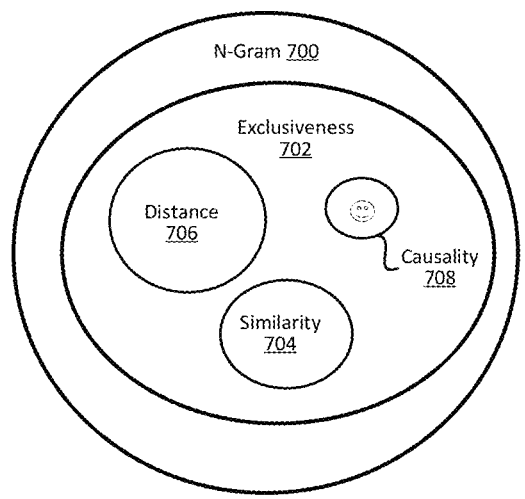
FIG. 7C schematically depicts filtering of candidate tag sequences using learned knowledge according to certain embodiments of the present disclosure.

The knowledge filter 150 is configured to, upon receiving the learned knowledge from the knowledge learning module 130 and the candidate tag sequences from the candidate tag sequence generation module 140, using the learned knowledge to filter the candidate tag sequences to obtain filtered tag sequences, and provide the filtered tag sequences to the function module 160. In certain embodiments, the knowledge filter 150 is configured to use tag exclusiveness to filter the candidate tag sequence, and then use the tag similarity, tag distance, and tag causality to further filter the candidate tag sequences. The filtered tag sequences are coherent in nature. In certain embodiments, the algorithm first uses exclusiveness knowledge to filter, and then it uses other three types of knowledge, respectively. Finally, it gets the minimal intersection as final results. FIGS. 7A-7C schematically show the implementation for filtering the candidate tag sequences according to certain embodiments of the present disclosure, where the smiling face section corresponds to filtered tag sequences. As shown in FIG. 7A, for the total candidate tag sequences 700 generated using N-gram, the candidate sequences having two exclusive tags are removed, so as to obtain inclusive tag sequences 702, where each of the inclusive tag sequences has at most one introductive tag.

The similarity tag sequences (circle) 704 includes the candidate tag sequences in the inclusive tag sequences 702 that have a similarity value greater than a similarity threshold. In certain embodiments, for a tag sequence having two tags, the similarity value is the similarity learned by the tag similarity module 134 for the two tags, for example by Fisher's Exact test. For a tag sequence having more than two tags, the similarity value for each adjacent two tags shall be greater than the similarity threshold. For example, if a candidate tag sequence has five sequential tags ABCDE, then the similarity value for each of AB, BC, CD, and DE shall be greater than the similarity threshold. In certain embodiments, the similarity threshold is set at about 0.2-0.8. In certain embodiments, the similarity threshold is set at about 0.5. The distance tag sequences (circle) 706 includes the candidate sequences in the inclusive tag sequences 702 that have a distance value equaling to or smaller than a distance threshold. In certain embodiments, for a tag sequence having two tags, the distance value is the distance learned by the tag distance module 136 for the two tags. If a tag sequence has more than two tags, the distance value for each adjacent two tags shall equal to or be smaller than the distance threshold. For example, if a candidate tag sequence have five sequential tags ABCDE, then the distance value for each of AB, BC, CD, and DE shall equal to or be smaller than the distance threshold. In certain embodiments, the distance threshold is set at about 1-8. In certain embodiments, the threshold is set at 4. The causality tag sequences (circle) 708 includes the candidate sequences in the inclusive tag sequences 702 that have a causality relationship. In certain embodiments, a tag sequence is determined to have causality relationship if any of two sequential tags in the tag sequences have causality relationship. The similarity threshold and the distance threshold may depend heavily on the category of the products, the value of N of the N-gram, the number of datasets in the category, and the number of candidate tag sequences.

As show in FIG. 7A, the tag sequences that present in all the similarity tag sequences 704, the distance tag sequences 706 and the causality tag sequences 708 are chosen as the filtered tag sequences. If a sufficient number of filtered tag sequences are obtained this way, the obtained filtered tags sequences are the final content plan. The sufficient number may be, for example, greater than 50-100. If the number of obtained filtered tag sequences are insufficient or there is no filtered tag sequence obtained at all, the present disclosure may further use the criteria shown in FIG. 7B.

As shown in FIG. 7B, when there is no overlap among the similarity tag sequences 704, the distance tag sequences 706 and the causality tag sequences 708 (or the number of overlapped tag sequences by the three circles 704, 706 and 708 is insufficient), the tag sequences that present in any two of the three circles 704, 706, 708 would then be selected. Further, if the circles 704, 706 and 708 have no overlaps, as shown in FIG. 7C, the knowledge filter 150 may be configured to choose the smallest circles, for example the causality tag sequences 708, which has a smaller number of candidate tag sequences than that of the similarity tag sequences 704 and the distance tag sequences 706.

FIG. 8 schematically illustrates a filter algorithm according to certain embodiments of the present disclosure. As shown in FIG. 8, when the candidate tag sequences are generated, the candidate tag sequences are first filtered by exclusiveness, where the tag sequences having two exclusive tags are removed. Then the overlapped tag sequence sets are determined, where the SDC set includes candidate tag sequences that presents in all three of the similarity tag sequences 706, the distance tag sequences 708 and the causality tag sequences 710, the SD set includes intersections between the similarity tag sequences 706 and the distance tag sequences 708, the SC set includes intersections between the similarity tag sequences 706 and the causality tag sequences 710, and the DC set includes intersections between the distance tag sequences 708 and the causality tag sequences 710. In certain embodiments, when SDC set is not empty, the final tag sequences is SDC; if all of SD, SC, and DC are empty, the final tag sequence is the one from S, D and C that has the smallest number of tag sequences; when at least one of SD, SC and DC is not empty, the final tag sequences is the one from the S, D, C, SD, SC, and DC that has the smallest number of tag sequences. In certain embodiments, the knowledge filter 150 may also obtain the final tag sequence or namely the filtered tag sequences using other variations of the method shown in FIG. 8. In certain embodiments, the knowledge filter 150 may also rank the filtered tag sequences based on their similarity, distance and causality relationship. The filtered tag sequences are also named coherent tag sequences because the tags in each of the filtered tag sequence are coherent with each other. The filtered tag sequences may include for example, tag sequences of ("sufficient film source," "teaching content"), ("home theater," "enjoy"), ("excellent sound quality," "enjoy"), ("simple," "fashionable and beautiful"), ("colorful," "natural picture"), ("easy to control," "suitable for all ages"), ("natural picture," "eye care/anti-fatigue"), ("home theater," "home"), etc. After obtaining the filtered candidate tag sequences, the knowledge filter 150 is further configured to provide the filtered candidate tag sequences to the function module 160.

The function module 160 may be stored in the computing device 110 or any other computing devices that are in communication with the computing device 110. The function module 160 is configured to perform certain functions using the filtered candidate tag sequences. In certain embodiments, the function is to generate a new text description, and the filtered candidate tag sequences are used as the content plan, such that the function module 160 can use the content plan to generate sentences, and the sentences forms the text description of a product. In certain embodiments, for generating a new description text of a product, the function module 160 is configured to select a number of industrial attributions of the product, use the industrial attributions to obtain introductive tags or inferred tags, select one or a few tag sequences using the introductive tags or inferred tags from the coherent tag sequences corresponding to the category of the product, generate a sentence from each of the selected coherent tag sequences, and arrange the sentences to form the new description of the product. In certain embodiments, the selection of the coherent tag sequences may use criteria other than or in addition to the introductive tags, such as the planned style of the text to be generated.

The user interface 170 is configured to provide a user interface or graphic user interface in the computing device 110. In certain embodiments, the user or the administrator of the system is able to configure parameters for the computing device 110, especially the parameters used in the content planning application 118 using the user interface 170.

Figure 9:
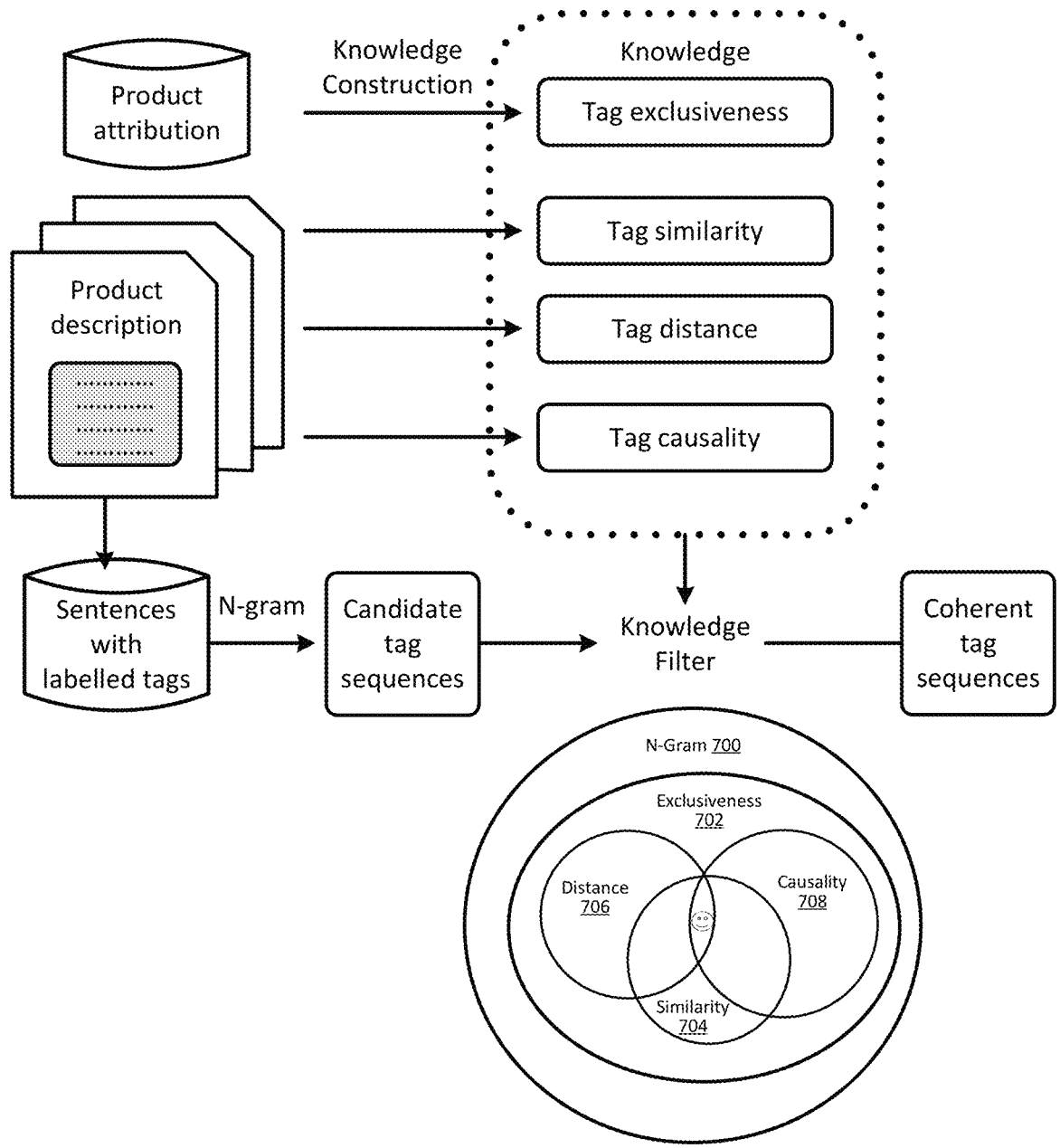
FIG. 9 schematically depicts an architecture of a knowledge-powered content planning system according to certain embodiments of the present disclosure.

FIG. 9 schematically depicts an architecture of a content planning system according to certain embodiments of the present disclosure. As shown in FIG. 9, product attribution database or product database includes product industrial attributions, and product description database include labeled product descriptions. The labeled product descriptions can be used to generate candidate tag sequences busing N-gram. Further, four types of knowledge can be learned from the product industrial attributions and the product descriptions. The learned knowledge can be used to filter the candidate tag sequences, so as to obtain coherent tag sequences. The coherent tag sequences for a category of products are good content plan, and can be used to generate product description for anyone of the product in the category.

Figure 10:
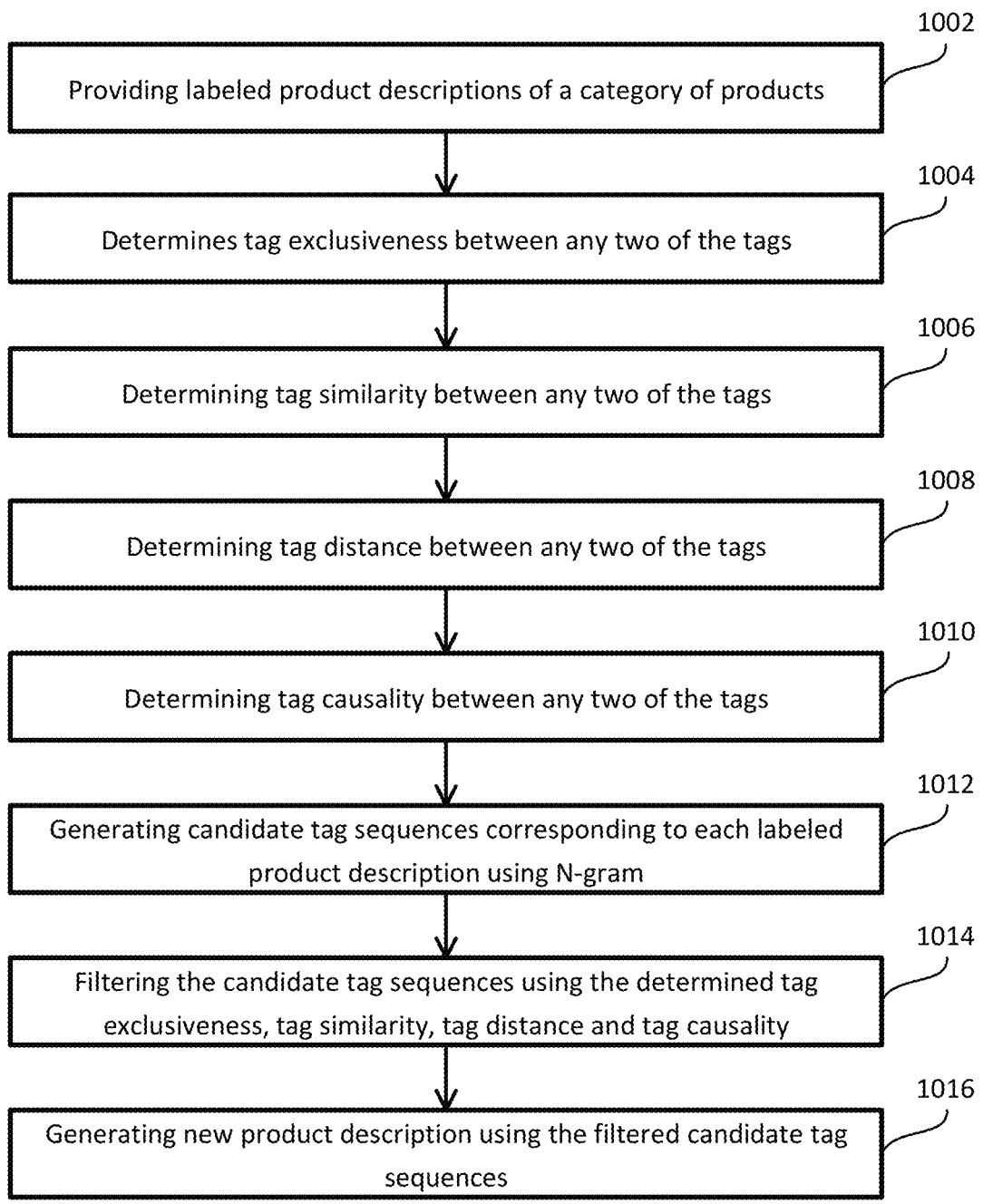
FIG. 10 schematically depicts a method for generating a content plan according to certain embodiments of the present disclosure.

FIG. 10 schematically depicts a method for content planning according to certain embodiments of the present disclosure. In certain embodiments, the method 1000 as shown in FIG. 10 may be implemented on a computing device 110 as shown in FIG. 1. It should be particularly noted that, unless otherwise stated in the present disclosure, the steps of the method may be arranged in a different sequential order, and are thus not limited to the sequential order as shown in FIG. 10.

At procedure 1002, the data preparation module 120 provides labeled product descriptions of a category of products to the knowledge learning module 130 and the candidate tag sequence generation module 140. Each of the product descriptions includes multiple sentences, each sentence is divided into one or several clauses, and each clause is labeled with a tag (a few of the clauses may have no tag or a dummy tag0). The tags can be introductive tags representing product industrial attributions and description tags extracted from the product description and not being introductive tags.

At procedure 1004, for each labeled product description, the knowledge learning module 130 determines tag exclusiveness between any two of the tags based on the type of the tags. When both of the two tags are introductive tags, the two tags are exclusive, otherwise, the two tags are inclusive. In certain embodiments, the knowledge learning module 130 may also determine tag exclusiveness between any two of the tags in the tag list based on the types of the tags.

At procedure 1006, for all the labeled product descriptions, the knowledge learning module 130 determines tag similarity between any two of the tags based on whether the two tags co-occur in any of the labeled product descriptions. The co-occurrence rate of the two tags in the labeled product descriptions are similarity value between the two tags. In certain embodiments, the similarity value between any two tags are determined using Fisher's exact test.

At procedure 1008, for all the labeled product descriptions, the knowledge learning module 130 determines tag distance between any two of the tags based on whether the two tags co-occur in any of the labeled product descriptions, and the distance between the two tags is measured by the number of clauses between the two tags in the labeled product descriptions that the two tags co-occur. The distance between the two tags is one if the two tags are next to each other, and the distance between the two tags is two if there is another clause between the two tags. When the two tags co-occur in multiple product descriptions, the distance values for the two tags are averaged. For example, if the two tags co-occur in 20 of a total of 100 product descriptions, with a distance of one in 10 of the product descriptions, with a distance of two in six of the product descriptions, and a distance of three in four of the product description, the distance between the two tags would be (10×1+6×2+4×3)/20=1.7.

At procedure 1010, for all the labeled product descriptions, the knowledge learning module 130 determines tag causality between any two of the tags based on whether the two tags co-occur in the labeled product descriptions, and whether there are causality terms between the two adjacent tags in the labeled product descriptions that the two tags co-occur. The two tags are determined to have causality relationship if they co-occur in at least one product description and have causality terms such as "lead to" or "because of" or "due to" immediately between the two tags in the at least one product description. In certain embodiments, the two tags are determined to have causality relationship when their causality is shown in at least two product descriptions.

At procedure 1012, upon receiving the labeled product descriptions of the category of products from the data preparation module 120, the candidate tag sequence generation module 140 generates, for each labeled product description, tag sequences using N-gram, combines the tag sequences generated from all the labeled product descriptions to form the candidate tag sequences, and sends the candidate tag sequences to the knowledge filter 150. For example, when N is five, if a first of the product descriptions has two tags, tag1 and tag2, the number of generated tag sequences would be one, that is, tag1-tag2. If a second of the product descriptions has three tags, tag3-tag5, the number of generated tag sequences would be three, that is, tag3-tag4, tag4-tag5, tag3-tag4-tag5. If a third of the product descriptions has six tags, tag6-tag11, the number of generated tag sequences would be 14, that is, tag6-tag7, tag7-tag8, tag8-tag9, tag9-tag10, tag10-tag-11, tag6-tag7-tag-8, tag7-tag8-tag9, tag8-tag9-tag10, tag9-tag10-tag11, tag6-tag7-tag8-tag9, tag7-tag8-tag9-tag10, tag 8-tag9-tag10-tag11, tag6-tag7-tag8-tag9-tag10, and tag7-tag8-tag9-tag10-tag11. The generated tag sequences from the different product descriptions are combined, and the redundant tag sequences are removed, so as to obtain the candidate tag sequences.

At procedure 1014, upon receiving the knowledges from the knowledge learning module 130 and the candidate tag sequences from the candidate tag sequence generation module 140, the knowledge filter 150 filters the candidate tag sequences using the knowledges, and sends the filtered tag sequences to the function module 160. The filtering is performed by first removing the candidate tag sequences that have two exclusive tags and then by choosing the candidate tag sequences that have tags with high similarity, close distance, and causation relationship if possible. In certain embodiments, the filtering is performed using the methods shown in any of FIGS. 7A, 7B, 7C, and 8 or a variance of the methods. The obtained filtered tag sequence is also named a content plan.

At procedure 1016, upon receiving the content plan from the knowledge filter 150, the function module 160 may use the content plan to generate a new product description, for example, using the content plan and at least one of the industrial attributions of the product, style of product description a user prefers, and the old version of the product description. In certain embodiments, the function module 160 selects several tag sequences from the content plan based on the important product industrial attributions, arrange the content sequences based on the style the user selected, and generate one sentence from each of the tag sequences to form the new product description.

In certain aspects, the present disclosure is related to a non-transitory computer readable medium storing computer executable code. The code, when executed at a processor 112 of the computing device 110, may perform the methods 1000 as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

Certain embodiments of the present disclosure is compared with recurrent neural network (RNN) based method. The RNN method for example, can be TopicRNN. FIG. 11 shows comparison between certain embodiments of the present disclosure and the RNN based method. As shown in FIG. 11, for categories of garment, air-conditioner, television, washer, and refrigerator, the knowledge-based method according to the present disclosure is obviously advantages over the RNN based method.

In summary, all the related methods in the field have coherence problem, represented by high false positive and high negative. In contrast, the present disclosure provide a system and method that can automatically generate coherent content plans for product description in e-commerce, reduce false positive rate and false negative rate. The system incorporates a knowledge construction component, a candidate tag-sequence generation algorithm, and a content plan filter algorithm. The knowledge-powered content planning method relies on the mining of versatile tag knowledges from the dataset and product attributions: tag similarity, tag distance, tag causality, and tag exclusiveness. Here "tag" means theme words that represent main idea of each sentence, each product attribution can be treated as a tag. The disclosure assumes each sentence has a tag or multi tags to represent its main idea (theme). Thus, the relationship between the tags is a miniature of the relationship between sentences in a product description. These knowledges about tags represent various aspects in a product description, not only the distribution of theme, local (syntactic) dependencies, global (semantic) dependencies, but also semantic role of natural language, even causality relationship and features of product attributions. Therefore, leveraging these knowledges can improve coherency of content planning compared with the existing methods. Specifically, the knowledges of tag exclusiveness, tag similarity and tag distance can capture both global/local sematic relationship and word exclusiveness in a paragraph, thus reduce false positive for content planning; the knowledges of tag distance and tag causality can pinpoint the low frequent topic relationship, thus reduce false negative for content planning.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for obtaining a content plan, wherein the system comprises a computing device, the computing device comprises a processor and a storage device storing computer executable code, and the computer executable code, when executed at the processor, is configured to:

provide a tag for each clause of each sentence of each product description of each of a category of products, wherein the tags comprise a plurality of introductive tags corresponding to industrial attributions of the category of products and a plurality of description tags corresponding to a plurality of descriptions of the category of products;

determine tag exclusiveness between any two of the tags, wherein the two of the tags are defined as having the tag exclusiveness when both of them are introductive tags;

determine tag similarity between any two of the tags based on co-occurrence rate of the two of the tags in the product descriptions;

determine tag distance between any two of the tags based on a number of the clauses between the two of the tags in the product descriptions where the two of the tags co-occur;

determine tag causality between any two of the tags based on a causation relationship between the two of the tags in the product descriptions where the two of the tags co-occur;

generate candidate tag sequences from each of the product descriptions using the tags therein; and filter the candidate tag sequences using the tag exclusiveness, the tag similarity, the tag distance and the tag causality to obtain the content plan.

2. The system of claim 1, wherein the category of products comprises refrigerator, air-conditioner, television, and washing machine.

3. The system of claim 1, wherein the category of products comprises clothing, consumer electronics, home appliance, computer and office, sports and outdoors, health and beauty, toys, and shoes.

4. The system of claim 3, wherein the category of products is clothing, the industrial attributions comprise size, color, and material, and the descriptions comprise functionality, style, feeling, potential audience, and scene.

5. The system of claim 1, wherein the computer executable code is configured to determine the tag similarity using Fisher's exact test.

6. The system of claim 1, wherein the computer executable code is configured to determine the tag distance between the two of the tags by averaging the tag distances between the two tags in the product descriptions where the two of the tags co-occur.

7. The system of claim 1, wherein the computer executable code is configured to determine that the tag causality exists between the two of the tags when at least one of terms "lead to," "stem from," "because of," and "due to" exists between the two of the tags in any of the product descriptions where the two of the tags co-occur.

8. The system of claim 1, wherein the computer executable code is configured to generate the candidate tag sequences using N-gram.

9. The system of claim 1, wherein the computer executable code is configured to filter the candidate tag sequences by:

removing the candidate tag sequences that contain two introductive tags; and retaining tag sequences that at least have the tag distance less than a pre-defined tag distance threshold, have the tag similarity greater than a pre-defined tag similarity threshold, or have the tag causality.

10. The system of claim 1, wherein the computer executable code is further configured to generate a new product description based on the content plan.

11. A method, comprising:

providing, by a computing device, a tag for each clause of each sentence of each product description of each of a category of products, wherein the tags comprise a plurality of introductive tags corresponding to industrial attributions of the category of products and a plurality of description tags corresponding to a plurality of descriptions of the category of products;

determining, by the computing device, tag exclusiveness between any two of the tags, wherein the two of the tags are defined as having the tag exclusiveness when both of them are introductive tags;

determining, by the computing device, tag similarity between any two of the tags based on co-occurrence rate of the two of the tags in the product descriptions;

determining, by the computing device, tag distance between any two of the tags based on a number of the clauses between the two of the tags in the product descriptions where the two of the tags co-occur;

determining, by the computing device, tag causality between any two of the tags based on a causation relationship between the two of the tags in the product descriptions where the two of the tags co-occur;

generating, by the computing device, candidate tag sequences from each of the product descriptions using the tags therein; and filtering, by the computing device, the candidate tag sequences using the tag exclusiveness, the tag similarity, the tag distance and the tag causality to obtain a content plan.

12. The method of claim 11, wherein the category of products comprises clothing, refrigerator, air-conditioner, television, and washing machine, and when the category of products is clothing, the industrial attributions comprise size, color, and material, and the descriptions comprise functionality, style, feeling, potential audience, and scene.

13. The method of claim 11, wherein the step of determining the tag similarity is performed using Fisher's exact test;

wherein the step of determining the tag distance between the two of the tags is performed by averaging the tag distances between the two tags in the product descriptions where the two of the tags co-occur; and wherein the tag causality between the two of the tags is determined when at least one of terms "lead to," "stem from," "because of," and "due to" exists between the two of the tags in any of the product descriptions where the two of the tags co-occur.

14. The method of claim 11, wherein the candidate tag sequence is generated using N-gram.

15. The method of claim 11, wherein the step of filtering the candidate tag sequences comprises:

removing the candidate tag sequences that contain two introductive tags; and retaining tag sequences that at least have the tag distance less than a pre-defined tag distance threshold, have the tag similarity greater than a pre-defined tag similarity threshold, or have the tag causality.

16. The method of claim 11, further comprising: generating a new product description based on the content plan.

17. A non-transitory computer readable medium storing computer executable code, wherein the computer executable code, when executed at a processor of a computing device, is configured to:

provide a tag for each clause of each sentence of each product description of each of a category of products, wherein the tags comprise a plurality of introductive tags corresponding to industrial attributions of the category of products and a plurality of description tags corresponding to a plurality of descriptions of the category of products;

determine tag exclusiveness between any two of the tags, wherein the two of the tags are defined as having the tag exclusiveness when both of them are introductive tags;

determine tag similarity between any two of the tags based on co-occurrence rate of the two of the tags in the product descriptions;

determine tag distance between any two of the tags based on a number of the clauses between the two of the tags in the product descriptions where the two of the tags co-occur;

determine tag causality between any two of the tags based on a causation relationship between the two of the tags in the product descriptions where the two of the tags co-occur;

generate candidate tag sequences from each of the product descriptions using the tags therein; and filter the candidate tag sequences using the tag exclusiveness, the tag similarity, the tag distance and the tag causality to obtain the content plan.

18. The non-transitory computer readable medium of claim 17, wherein the computer executable code is configured to:

determine the tag similarity using Fisher's exact test;

determine the tag distance between the two of the tags by averaging the tag distances between the two tags in the product descriptions where the two of the tags co-occur; and determine that the tag causality exists between the two of the tags when at least one of terms "lead to," "stem from," "because of" and "due to" exists between the two of the tags in any of the product descriptions where the two of the tags co-occur.

* * * * *